US012800094B2

(12) United States Patent
Carollo et al.

(10) Patent No.: US 12,800,094 B2
(45) Date of Patent: Nov. 17, 2026

(54) SUPPORT DEVICE FOR VIDEO-PHOTOGRAPHIC APPARATUS

(71) Applicant: Videndum Media Solutions S.P.A., Cassola (IT)

(72) Inventors: Andrea Carollo, Zugliano (IT); Matteo Chemin, Bassano del Grappa (IT); Paolo Speggiorin, Mussolente (IT)

(73) Assignee: Videndum Media Solutions S.P.A., Cassola (IT)

( * ) Notice: Subject to any disclaimer, the term of this patent is extended or adjusted under 35 U.S.C. 154(b) by 190 days.

(21) Appl. No.: 18/735,644

(22) Filed: Jun. 6, 2024

(65) Prior Publication Data

US 2024/0410521 A1 Dec. 12, 2024

(30) Foreign Application Priority Data

Jun. 7, 2023 (IT) ........................ 102023000011658

(51) Int. Cl.
*F16M 11/28* (2006.01)
*G03B 17/56* (2021.01)

(52) U.S. Cl.
CPC ........... *F16M 11/28* (2013.01); *G03B 17/561* (2013.01); *F16M 2200/025* (2013.01)

(58) Field of Classification Search
None
See application file for complete search history.

(56) References Cited

U.S. PATENT DOCUMENTS

| | | | | | |
|---|---|---|---|---|---|
| 3,201,080 | A * | 8/1965 | Emilie | F16M 11/36 | 248/156 |
| 4,174,900 | A * | 11/1979 | Ina | F16M 11/32 | 403/109.5 |
| 5,275,364 | A * | 1/1994 | Burger | F16L 3/00 | 396/428 |
| 5,887,835 | A | 3/1999 | Hein et al. | | |
| 6,824,319 | B1 | 11/2004 | Speggiorin | | |
| 7,364,125 | B2 | 4/2008 | Speggiorin | | |
| 8,231,088 | B2 | 7/2012 | Lu | | |
| 10,663,839 | B1 * | 5/2020 | O'Brien | F16M 11/16 | |
| 2011/0079686 | A1 * | 4/2011 | Palik | F41A 23/06 | 248/161 |
| 2021/0190262 | A1 * | 6/2021 | Dal Ben | F16M 11/28 | |

FOREIGN PATENT DOCUMENTS

| | | | | | |
|---|---|---|---|---|---|
| CN | 106840126 | A * | 6/2017 | G01C 15/00 |
| DE | 19619081 | B4 * | 1/2010 | A01G 3/08 |
| EP | 2143330 | A1 * | 1/2010 | A01K 97/10 |
| WO | 2016131102 | A1 | 8/2016 | |
| WO | 2020003060 | A1 | 1/2020 | |

* cited by examiner

*Primary Examiner* — Rodney E Fuller
(74) *Attorney, Agent, or Firm* — Volpe Koenig

(57) ABSTRACT

A support device (1; 100) for video-photographic apparatus, includes at least one telescopic leg (2; 100) having a first tubular section (10), a second tubular section (11) and a third tubular section (12) which are connected in telescopic engagement one after the other, a locking mechanism (20), configured to lock and to allow the relative sliding between the first tubular section (10), the second tubular section (11) and the third tubular section (12). Both the first tubular section (10) and the third tubular section (12) are partially housed inside the second tubular section (11) and are configured to slide axially away from and towards the inside of the second tubular section (11) through the longitudinally opposite ends of the second tubular section (11).

13 Claims, 5 Drawing Sheets

SUPPORT DEVICE FOR VIDEO-PHOTOGRAPHIC APPARATUS

CROSS-REFERENCE TO RELATED APPLICATIONS

This application claims priority to Italian Patent Application No. 102023000011658, filed Jun. 7, 2023, which is incorporated herein by reference as if fully set forth.

TECHNICAL FIELD

The present invention concerns a support device for video-photographic apparatus.

BACKGROUND

In the technical sector of photography, the use of support devices for video-photographic apparatus is widely known, among which tripods and monopods are particularly widespread and appreciated, both at an amateur and professional level. These devices typically comprise one or more telescopic legs (three for tripods and one for monopods), each of which can be extended so as to be able to conveniently support the video-photographic apparatus in the staging position and can then be retracted so as to reduce the overall size of the support device and allow its convenient transport and storage.

A telescopic leg used in the known support devices comprises a plurality of consecutive tubular sections, wherein each section is housed in engagement inside the successive section with the possibility of axial sliding.

In this way, each tubular section can be displaced between a retracted configuration in which it is mainly housed inside the successive tubular section and an extended configuration in which it is extracted from the successive tubular section protruding outside the latter for a prevalent portion thereof.

It should be specified that by "tubular section" of a telescopic leg is intended a single tube portion, so that the telescopic leg is formed as a whole by a single tube, composed of several tubular sections slidingly engaged one inside the other.

In this sense, the portions of telescopic legs formed by several tubes placed side by side and parallel to each other, such as those described in U.S. Pat. Nos. 8,231,088 and 5,887,835, shall not to be considered "tubular sections".

The telescopic leg typically comprises locking mechanisms arranged between pairs of successive tubular sections adapted to lock and unlock the relative sliding between the tubular sections, thus defining the desired relative position between them.

These locking mechanisms can be typically actuated individually to allow independent adjustment of each pair of successive tubular sections.

Examples of support devices comprising a plurality of telescopic rods as described above are illustrated in U.S. Pat. Nos. 6,824,319 and 7,364,125.

The support devices described above, however, have some drawbacks, including the fact that they are not always fast enough in staging and storage operations.

WO 2016/131102 describes a tripod in which each leg is provided with a simultaneous locking and unlocking system of the different tubular sections that compose it, which comprises a plurality of telescopic rods internal to the tubular sections, mutually constrained in rotation, stressed in rotation by a torsion spring and which can be operated in rotation to actuate or release respective locking mechanisms provided between adjacent tubular sections.

This system, however, requires a kinematic chain with numerous transmissions and requires numerous components, which render the system complicated to make, and which, above all, is not able to offer sufficient rigidity and stability to the legs when in an extended configuration and, consequently, to the tripod.

It should be emphasized that this characteristic is fundamental in this technical sector and it actually distinguishes the level of quality of the products on the market.

WO 2020/003060, in the name of the same Applicant, describes a tripod in which each leg is provided with a simultaneous locking and unlocking system of the different tubular sections that compose it, comprising a connection element, placed externally to the telescopic leg, which connects between them the locking devices provided between the consecutive tubular sections so as to operate them in locking or in release with a single movement.

The Applicant has observed that the structure proposed in WO 2020/003060, very simple and effective in the realization thereof, holds an independent clamping load in the different locking mechanisms.

In this way, however, each locking mechanism must be adjusted independently of one another so as to ensure that the actuation of the connection element gives rise to a tightening which is as uniform as possible between the different tubular sections of the telescopic leg.

Furthermore, the presence of the connection element increases the overall footprint of the telescopic leg.

SUMMARY

The problem underlying the present invention is to realise a support device for video-photographic apparatus, structurally and functionally designed to overcome at least in part the limits set out above with reference to the cited prior art.

In the context of this problem, it is an object of the invention to realise a support device that is simple to manufacture, with reduced footprints, and allows a rapid locking and unlocking of the telescopic legs.

This problem is solved and these objects are achieved by the present invention by means of a support device for video-photographic apparatus, having one or more of the features disclosed in the description and claims that follow.

In a first aspect thereof, therefore, the present invention is directed to a support device for video-photographic apparatus, comprising at least one telescopic leg displaceable between an extended configuration and a retracted configuration.

Preferably, the telescopic leg comprises a first tubular section, a second tubular section and a third tubular section which are connected in telescopic engagement one after the other.

Preferably, the telescopic leg comprises a locking mechanism, configured to lock and, alternatively, to allow the relative sliding between the first tubular section, the second tubular section and the third tubular section.

Preferably, the first tubular section is partially housed inside the second tubular section.

Preferably, the first tubular section is engaged with the second tubular section to slide axially away from and towards the inside of the second tubular section through a first end of the second tubular section.

Preferably, the third tubular section is partially housed inside the second tubular section.

Preferably, the third tubular section is engaged with the second tubular section to slide axially away from and towards the inside of the second tubular section through a second end of the second tubular section.

Preferably, the second end is longitudinally opposite to the first end.

Thanks to these characteristics, in the telescopic leg realised according to the present solution, the diameter of the intermediate tubular section, here identified with the second tubular section, is greater than the diameter of the two adjacent tubular sections, i.e. the first and third tubular section. In this way, both adjacent tubular sections (the first and the third) are housed in sliding engagement inside the second tubular section, entering from opposite ends. Thus, in the retracted configuration of the telescopic leg, the first tubular section protrudes from the first end of the second tubular section while the third tubular section protrudes from the second end of the second tubular section.

This particular configuration of the telescopic leg also offers the possibility of providing a particularly effective locking mechanism inside it, maintaining excellent rigidity characteristics between the various tubular sections, both in bending and in twisting, even when the telescopic leg is in an extended configuration, keeping a reduced footprint and without the need for components external to the telescopic leg.

It should be specified that two or more tubular sections are connected to each other in "telescopic engagement" when each pair of adjacent tubular sections is configured to allow the relative axial sliding of a tubular section inside the other up to a position of maximum extension and up to a position of maximum retraction.

In other words, the telescopic movement of the two or more tubular sections is ensured by the presence and mutual engagement of the adjacent tubular sections, so that any sleeve fitted externally to one or more tubular sections, for example as a gripping element or as a dampening element or as a connection element between locking devices, is not considered as a tubular section of the telescopic leg.

In addition, it should be specified that two elements are fixed together in a "rigid manner" when relative movements between them are not allowed.

A first tube (or a portion thereof) has a "diameter" less than a "diameter" of a second tube when the second tube can be inserted axially into the first tube.

This definition, regardless of the thickness of the second tube, can be interpreted literally when the first and second tube have a circular section, whereas it can be interpreted in a more generic manner when the first and/or second tubes have sections with a geometry other than the circle.

In the aforementioned aspect, the present solution may have one or more of the preferred features described below.

In some embodiments, a first terminal is fixed on the second tubular section at the first end thereof.

Preferably, the first terminal is rigidly fixed to the second tubular section.

Preferably, the first terminal is configured to guide the axial sliding of the first tubular section away from and towards the inside of the second tubular section.

Preferably, the first terminal has a tubular shape and comprises a first portion, axially external to the second tubular section, and a second portion, superimposed on the second tubular section.

In some embodiments, the first portion of the first terminal has an inner profile matching the outer profile of the first tubular section.

More preferably, the first portion is abutted against the first end of the second tubular section.

In some embodiments, the first terminal engages the first tubular section in two distinct and spaced regions along a longitudinal axis of the telescopic leg.

In this way, the guiding action during the sliding of the first tubular section away from and towards the inside of the second tubular section is more precise and the two tubular sections, in particular when they are in extended configuration, show an excellent rigidity in terms of bending.

Preferably, the second portion of the first terminal comprises a projection extended towards the inside of the second tubular section and housed in a through slot formed on the second tubular section.

In this way, the projection can engage and act as a guide for the sliding of the first tubular section and, at the same time, also to favour the fixing of the first terminal on the second tubular section.

In some embodiments, a second terminal is fixed on the second tubular section at the second end thereof.

Preferably, the second terminal is rigidly fixed to the second tubular section.

Preferably, the second terminal is configured to guide the axial sliding of the third tubular section away from and towards the inside of the second tubular section.

Preferably, the second terminal has a tubular shape and comprises a first portion, axially external to the second tubular section, and a second portion, superimposed on the second tubular section.

In some embodiments, the first portion of the second terminal has an inner profile matching the outer profile of the third tubular section.

More preferably, the first portion of the second terminal is abutted against the second end of the second tubular section.

In some embodiments, the third tubular section is housed inside the first tubular section, at least when the telescopic leg is in a retracted configuration.

The third tubular section therefore has a diameter smaller than the diameter of the first tubular section.

In this way, the first tubular section and the third tubular section do not interfere with each other when they are both housed inside the second tubular section, so as to allow a lesser encumbrance of the leg when in the retracted configuration.

In some embodiments, the first tubular section and/or the second tubular section and/or the third tubular section, and preferably all three tubular sections have a non-circular cross-section, such as for example oval, elliptical or polygonal.

Preferably, said cross-section has a prevalent dimension.

Preferably, said cross-section is polygonal, more preferably octagonal.

In some embodiments, the locking mechanism comprises a first brake displaceable between a locking position, in which it locks the axial sliding of the first tubular section with respect to the second tubular section, and a release position, in which it does not prevent the axial sliding of the first tubular section with respect to the second tubular section.

In some embodiments, the locking mechanism comprises a second brake, displaceable between a locking position, in which it locks the axial sliding of the third tubular section with respect to the second tubular section, and a release position in which it does not prevent the axial sliding of the third tubular section with respect to the second tubular section.

In some embodiments, the locking mechanism comprises an operating member connected to the first brake and the second brake.

Preferably, the operating member is configured so as to displace simultaneously the first brake and the second brake into the respective locking positions or into the respective release positions.

In this way, the relative sliding of the first of the second and third tubular section can be locked and unlocked simultaneously by acting on a single operating member, facilitating and speeding up the steps of extension and retraction of the telescopic leg by the user.

In some embodiments, the operating member is pivotable about an axis of rotation between an opening position and a closing position.

Preferably, the operating member is connected to the first brake and to the second brake by means of an eccentric system such that a pivoting movement of the operating member between the opening position and the closing position corresponds to a displacement of the first brake and of the second brake between the respective release positions and the respective locking positions.

In this way, the pivoting movement of the operating member exerts a first force on the first brake and a second force on the second brake which cause the simultaneous displacement thereof towards the respective locking positions.

Preferably, the second tubular section has a polygonal cross-section having a prevalent dimension and the axis of rotation of the operating member is substantially parallel to this prevalent dimension.

In other embodiments, the operating member is displaceable between an opening position and a closing position by movements other than a pivoting movement about an axis of rotation.

In some embodiments, the operating member is connected to the first brake and to the second brake such that, when the operating member is pivoted from the opening position to the closing position, the first brake transmits to the operating member a first reaction force and the second brake transmits to the operating member a second reaction force.

Preferably, at least one component of the second reaction force has a direction parallel to and opposite to that of a component of the first reaction force.

Preferably, the operating member is mounted on the telescopic leg so that the axis of rotation is displaceable along said direction parallel to said components of said first reaction force and said second reaction force.

In this way, the operating member is free to displace itself along this direction until it reaches a position in which the reaction forces caused by the displacement respectively of the first brake and of the second brake towards the locking position are balanced.

In particular, it will be noted that this balance position is determined by the same difference between the opposed reaction forces, so that the system actually self-regulates.

In this balance position, the force exerted by the operating member on the first and second brake is also uniform so that the force exerted by the first brake on the first tubular section and by the second brake on the second tubular section can also be equal.

This solution therefore advantageously allows to realize a locking mechanism on at least three tubular sections of a telescopic leg having a single command and at the same time also ensuring a homogeneous tightening load between the different tubular sections.

Preferably, the first reaction force and the second reaction force are substantially parallel to a longitudinal axis of said telescopic leg.

Preferably, the operating member is mounted on said telescopic leg so that said axis of rotation is displaceable along a direction substantially parallel to a longitudinal axis of said telescopic leg.

Preferably, the first brake and the second brake are displaced by the operating member between the respective release positions and the respective locking positions along a direction substantially parallel to a longitudinal axis of said telescopic leg.

In some embodiments, the operating member is mounted on the second tubular section.

Preferably, the operating member is in an intermediate position between the first brake and the second brake.

Preferably, the operating member is mounted on the first terminal.

In respective embodiments, the first brake and the second brake are displaced by the operating member from the respective release positions towards the respective locking positions away from the operating member or towards the operating member along the axial direction of the telescopic leg.

In some embodiments, the first brake is interposed between the first tubular section and the second tubular section. Alternatively, the first brake may be interposed between the first tubular section and the first terminal.

Furthermore, preferably, the first brake and the second tubular section (or, in the alternative solution, the first terminal) are shaped so that when the first brake is displaced towards the locking position it wedges between the first tubular section and the second tubular section (or the first terminal) locking the relative sliding thereof.

In some embodiments, the second brake is interposed between the third tubular section and the second tubular section. Alternatively, the second brake may be interposed between the third tubular section and the second terminal.

Furthermore, preferably, the second brake and the second tubular section (or, in the alternative solution, the second terminal) are shaped so that when the second brake is displaced towards the locking position it wedges between the third tubular section and the second tubular section (or the second terminal) locking the relative sliding thereof.

In some embodiments, the first brake is connected to the eccentric system by means of a first transmission element.

In some embodiments, the second brake is connected to the eccentric system by means of a second transmission element.

In some embodiments, the first transmission element and the second transmission element are connected to the eccentric system on opposite sides with respect to the axis of rotation of the operating member.

In some embodiments, the operating member comprises a lever pivotable about a pin rotatable about the axis of rotation of the operating member.

Preferably, the pin is housed with the possibility of sliding in a seat, for example a through slot, formed in the first terminal or in the second tubular section.

In some embodiments, the eccentric system is defined by a cam profile formed on the surface of the pin.

In some embodiments, the telescopic leg comprises a fourth tubular section, which is connected in telescopic engagement with the first tubular section or with the third tubular section.

Preferably, the fourth tubular section is partially housed inside the third tubular section and is engaged with the third tubular section to slide axially away from and towards the inside of the third tubular section on the opposite side to the second tubular section.

Preferably, the telescopic leg comprises a further locking mechanism, configured to lock and to allow the relative sliding between the fourth tubular section and the third tubular section.

The further locking mechanism may be of a conventional type, for example a ring nut.

In some embodiments, the support device is a monopod comprising a single telescopic leg and an attachment element for a video-photographic apparatus.

Preferably, the attachment element is arranged at the end of the first tubular section opposite to the second tubular section.

In some embodiments, the support device is a tripod comprising a crosspiece on which three telescopic legs realised according to the present solution are articulated.

Preferably, the telescopic legs are articulated to the crosspiece at the end of the first tubular section opposite to the second tubular section.

BRIEF DESCRIPTION OF THE DRAWINGS

The characteristics and advantages of the invention will best result from the detailed description of some preferred embodiments thereof, illustrated by way of non-limiting example with reference to the accompanying drawings, in which.

DETAILED DESCRIPTION

Figure 1A:
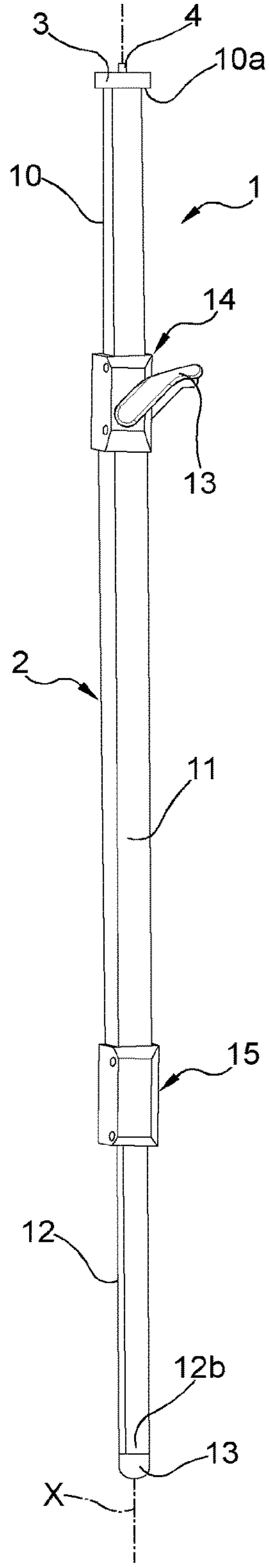
FIG. 1A is a schematic front elevational view of a first example of support device for video-photographic apparatus realised according to the present invention, comprising a telescopic leg in extended configuration and with the locking mechanism in the release position.
Figure 1B:
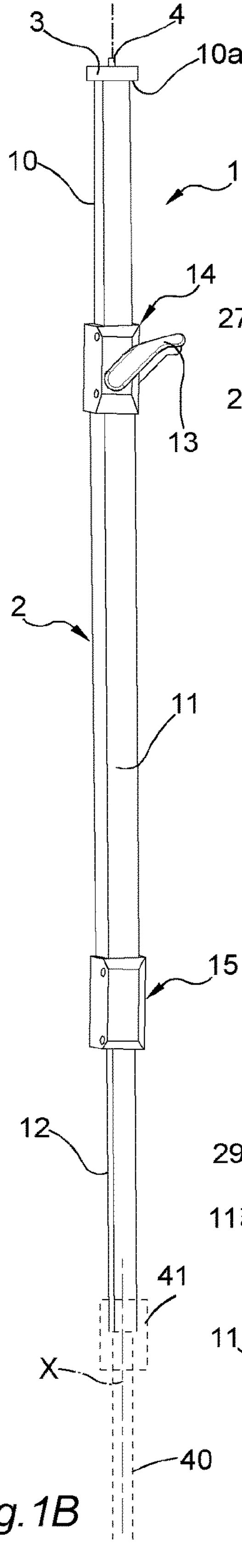
FIG. 1B shows a fourth tubular section of the leg and the corresponding locking mechanism.
Figure 2:
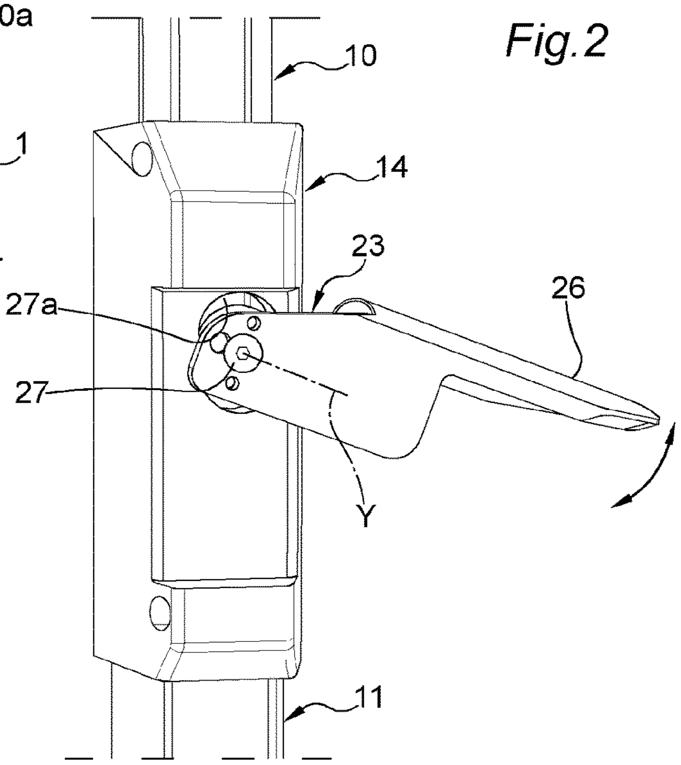
FIG. 2 is a schematic view on an enlarged scale of a detail of the telescopic leg of the support device of FIG. 1, in which a first terminal of the telescopic leg is illustrated.
Figure 3:
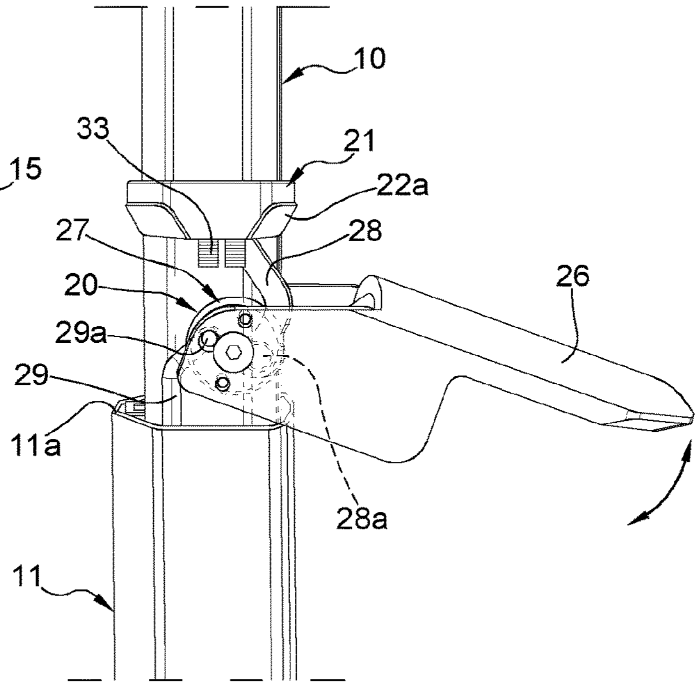
FIG. 3 is a schematic view of the detail of FIG. 2 with the first terminal removed and with some components in transparency.
Figure 4:
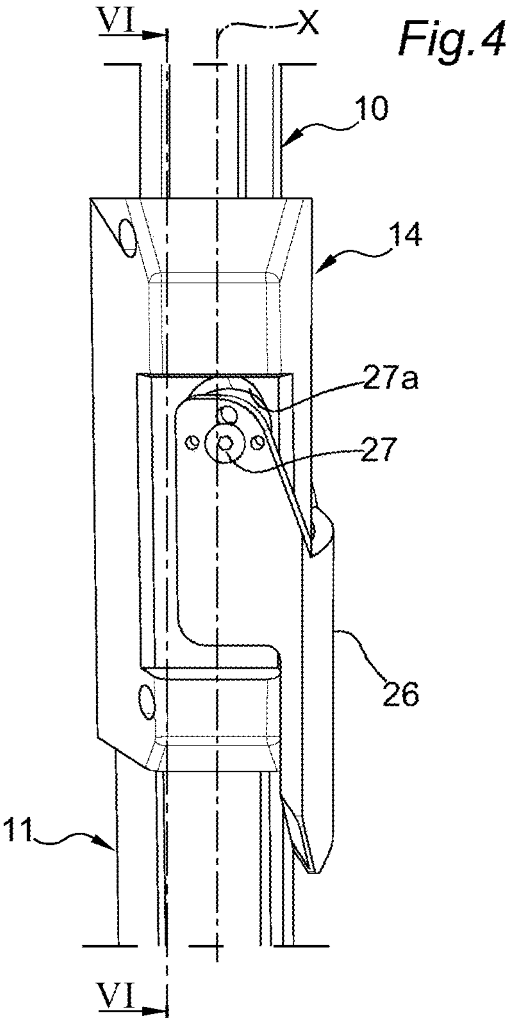
FIGS. 4 and 5 are views similar to FIGS. 2 and 3 with the locking mechanism in the locking position.
Figure 5:
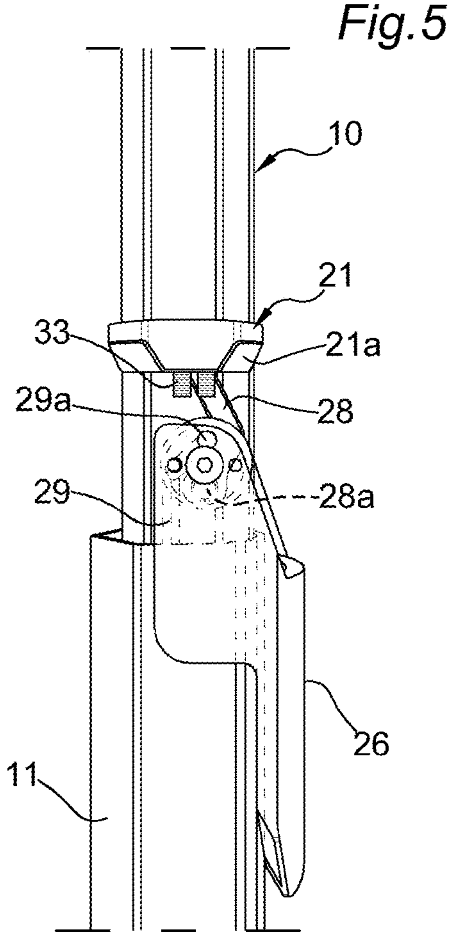
Figure 6:
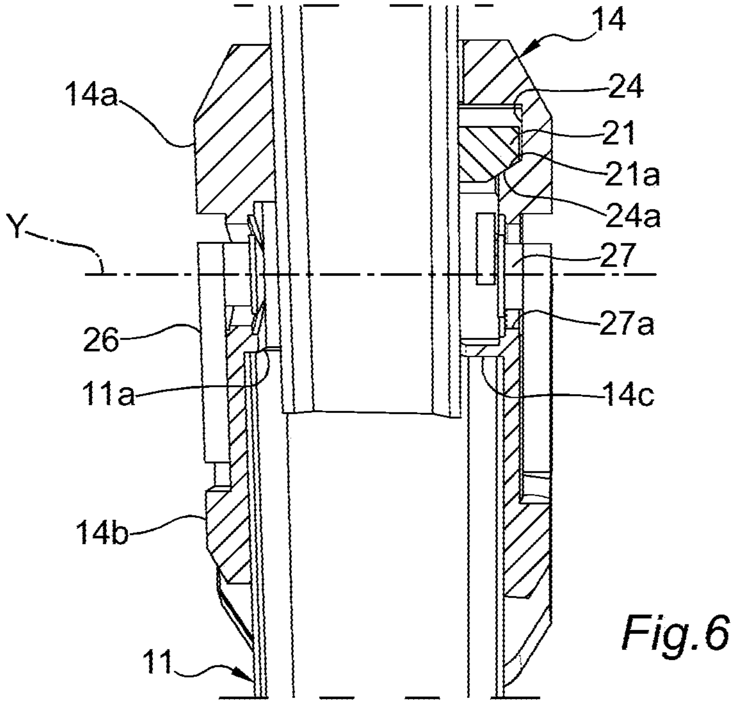
FIG. 6 is a sectional schematic view along the plane III-III of FIG. 4.
Figure 7:
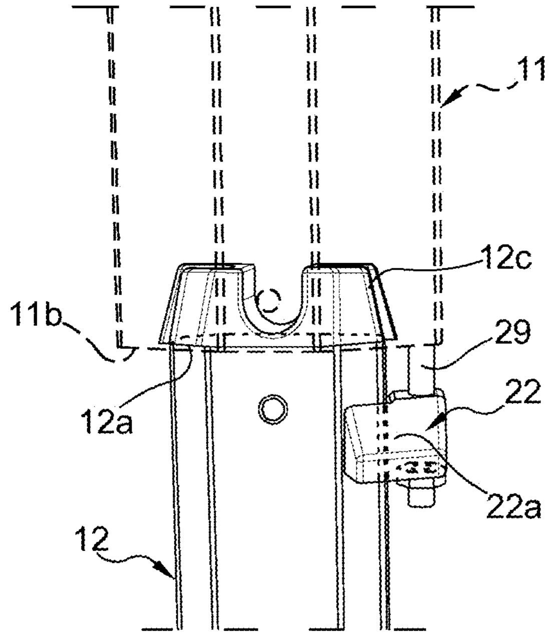
FIG. 7 is a schematic view on an enlarged scale of a further detail of the telescopic leg of the support device of FIG. 1, at a second terminal of the telescopic leg, in which the second terminal is removed.
Figure 8:
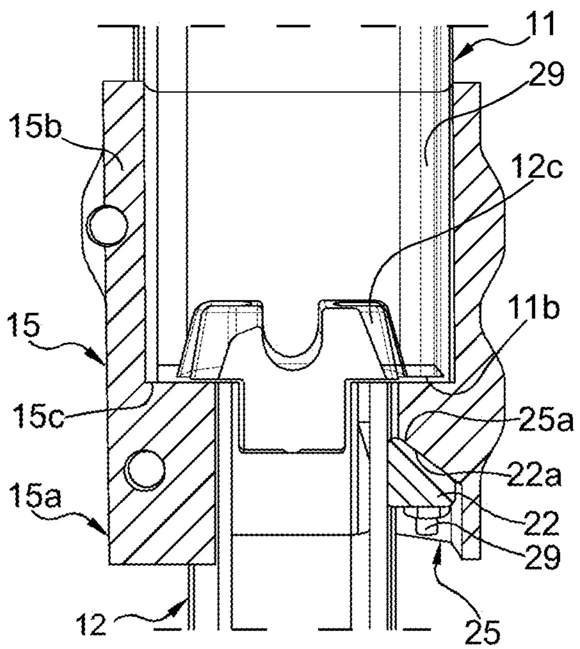
FIG. 8 is a longitudinal sectional view, similar to that of FIG. 6, of the detail of FIG. 7 in the presence of the second terminal.

With initial reference to FIGS. 1 to 8, a first example of a support device for video-photographic apparatus realised in accordance with the present invention is indicated with 1.

The support device 1 is a monopod and comprises a single telescopic leg 2 at the top of which a plate 3 is placed which is provided with an attachment element 4, for example a 3/8 screw, arranged to fix to the monopod 1 a video-photographic apparatus, in itself conventional and not illustrated in the attached Figures.

The telescopic leg 2 comprises a first tubular section 10, a second tubular section 11 and a third tubular section 12 which are connected in telescopic engagement one after another.

In particular, the first tubular section 10 is partially housed with the possibility of axial sliding inside the second tubular section 11 through a first end 11*a* of the second tubular section 11 and the third tubular section 12 is partially housed with the possibility of axial sliding inside the second tubular section 11 through a second end 11*b* of the second tubular section 11, longitudinally opposite to the first end 11*a*.

Preferably, the plate 3 is fixed to a first, free end 10*a* of the first tubular section 10, while to a free end 12*b* of the third tubular section 12 a foot 13 is fixed, for example in rubber, useful to allow a firm support on the ground of the monopod 1.

The three tubular sections 10, 11 and 12 are coaxial with each other, with a prevalent longitudinal dimension extending along their common X-axis and a cross-section having a polygonal, in particular octagonal shape elongated along a prevalent dimension.

The dimensions of the cross-sections of the tubular sections 10, 11 and 12 are such as to allow the sliding engagement inside the second tubular section 11 of both the first tubular section 10 and the third tubular section 12. Furthermore, the third tubular section 12 has a transverse dimension such as to allow the sliding engagement also inside the first tubular section 10.

It follows that the third tubular section 12 has the cross-section of smaller dimensions, that the second tubular section 11 has the cross-section of larger dimensions while the first tubular section 10 has the cross-section with intermediate dimensions.

At the first longitudinal end 11*a* and the second longitudinal end 11*b* of the second tubular section 11, a first terminal 14 and a second terminal 15, tubular, respectively, are rigidly fixed and configured to guide the axial sliding of the first tubular section 10 and, respectively, of the third tubular section 12 from and towards the inside of the second tubular section 11.

In particular, the first terminal 14 comprises a first portion 14*a* with a narrow internal section, substantially corresponding to the first tubular section 10, as well as a second portion 14*b* with an enlarged internal section defining an internal shoulder 14*c* abutted on the first end 11*a* of the second tubular section 11, so that the first portion 14*a* protrudes axially from the second tubular section 11 and the second portion 14*b* is instead superimposed on the second tubular section 11.

Similarly, the second terminal 15 comprises a first portion 15*a* with a narrow internal section, substantially corresponding to the third tubular section 12, and a second portion 15*b* with an enlarged internal section defining an internal shoulder 15*c* abutted on the second end 11*b* of the second tubular section 11, such that the first portion 15*a* protrudes axially from the second tubular section 11 and the second portion 15*b* is instead superimposed on the second tubular section 11.

A stop element 12*c* is engaged to close the third tubular section 12 at an end 12*a* thereof axially opposite to the foot 13. The stop element 12*c* locks the stroke of the third tubular section 12 by abutting against the shoulder 15*c*, so as to prevent the escape of the third tubular section 12 from the second tubular section 11.

The telescopic leg 2 comprises a locking mechanism 20, configured to lock and, alternatively, to allow the relative sliding between the first tubular section 10, the second tubular section 11 and the third tubular section 12.

The locking mechanism 20 comprises a first brake 21, configured to selectively lock the axial sliding of the first tubular section 10 inside the second tubular section 11, a second brake 22, configured to selectively block the axial sliding of the third tubular section 12 inside the second tubular section 11, as well as an operating member 23 connected to the first brake 21 and to the second brake 22 to simultaneously operate, in locking or in release, both the first brake 21 and the second brake 22.

In particular, the first brake 21 is displaceable along a direction substantially parallel to the axis X between a locking position, in which it prevents the axial sliding of the first tubular section 10 with respect to the second tubular section 11, and a release position, in which it allows the axial sliding of the first tubular section 10 with respect to the second tubular section 11.

The first brake 21 is housed in a chamber 24 formed inside the first portion 14*a* of the first terminal 14 and comprises a surface 21*a* which is inclined with respect to the axis X, resting on a corresponding surface 24*a* of the first terminal 14, so that the axial displacement of the first brake 21 also entails a corresponding radial displacement of the first brake 21 so as to press against the first tubular section 10 or to move away therefrom.

In a completely similar manner, the second brake 22 is displaceable along a direction substantially parallel to the axis X between a locking position, in which it prevents the axial sliding of the third tubular section 12 with respect to the second tubular section 11, and a release position, in which it allows the axial sliding of the third tubular section 12 with respect to the second tubular section 11.

The second brake 22 is housed in a chamber 25 formed inside the first portion 15*a* of the second terminal 15 and comprises a surface 22*a* which is inclined with respect to the axis X, resting on a corresponding surface 25*a* of the second terminal 14, so that the axial displacement of the second brake 22 also entails a corresponding radial displacement of the second brake 22 so as to press against the first tubular section 12 or to move away therefrom.

The operating member 23 comprises a lever 26, pivotable between an opening position (represented in FIGS. 1 to 3) and a closing position (represented in FIGS. 4 and 5) about an axis of rotation Y, substantially perpendicular to the longitudinal axis X of the telescopic leg 2.

The axis of rotation Y is defined by a pin 27 mounted on the first terminal 14 and housed in a seat 27*a*, which is suitably elongated along the axial direction X, so as to allow the pin 27 to displace freely along this direction.

The first brake 21 is connected to the operating member 23 by means of a first transmission element 28, which is constrained to the pin 27 in a constraint point 28*a*, spaced from the axis of rotation Y.

Similarly, the second brake 22 is connected to the operating member 23 by means of a second transmission element 29, which is constrained to the pin 27 in a constraint point 29*a*, positioned symmetrically to the constraint point 28*a* with respect to the axis of rotation Y.

The connection of the first and second brake 21, 22 with the pin 27 forms an eccentric system that allows the pivoting movement of the lever 26 to be transformed into a displacement of the first brake 21 and of the second brake 22 along the axis X.

When the lever 26 is pivoted between the opening position and the closing position, the pin 27 displaces the constraint points 28*a* and 29*a* so as to pull the transmission elements 28 and 29 and move the first brake 21 and the second brake 22 closer to the operating member 23.

The axial displacement of the first and second brake 21, 22 entails their simultaneous displacement towards the locking positions respectively against the first tubular section 10 and the third tubular section 12.

In this first embodiment, therefore, the transmission elements 28, 29 act as tie rods that transmit on the first and second brake 21 and 22 respectively a first tensile force and a second tensile force.

These tensile forces correspond to a first and a second equal and opposite reaction force exerted by the first brake 21 and by the second brake 21, 22 on the pin 27.

Any imbalance of these reaction forces entails the automatic displacement of the pin 27 along the seat 27*a*, until a balance position is found.

For example, if during the closing pivoting movement of the lever 26 the first brake 21 reaches the locking position against the first tubular section 10 while the second brake 22 has not yet reached its locking position against the third tubular section 12, then a further pivoting movement of the pin 26 will result in the displacement of the pin 26 along the seat 27 towards the first brake 21 and away from the second brake 22, so as to increase the traction exerted on the second brake 22 until it is balanced with that exerted on the first brake 21.

In this way, in the closing position of the lever 26, the first and second brake 21 and 22 will be in their respective locking positions exerting a substantially homogeneous tightening load on the respective tubular sections 10, 12.

When the lever 26 is pivoted in the opening position, the first brake 21 and the second brake 22 are displaced into the release position, suitably aided in this movement by the provision of one or more springs interposed between the first brake 21 and the second brake 22 and, respectively, the first terminal 14 and the second terminal 15.

Figure 9:
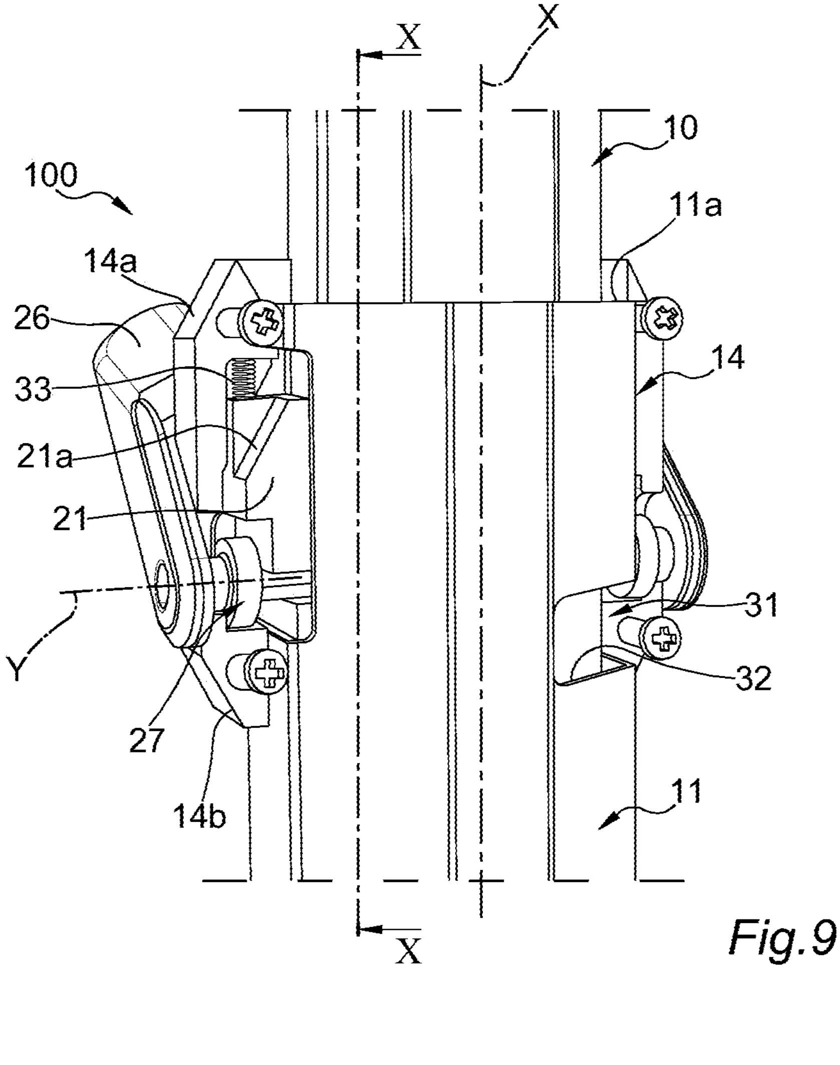
FIG. 9 is a schematic view on an enlarged scale of an embodiment variant of a detail of the telescopic leg of the previous Figures, with the locking mechanism in the release position.
Figure 10:
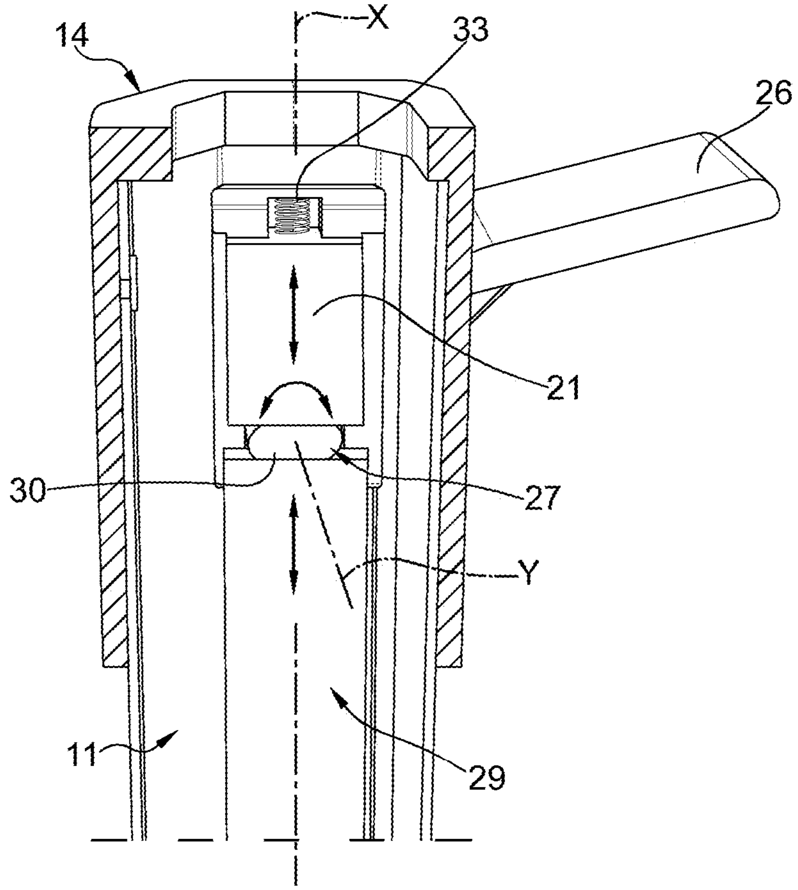
FIG. 10 is a sectional view along the plane X-X of FIG. 9.
Figure 11:
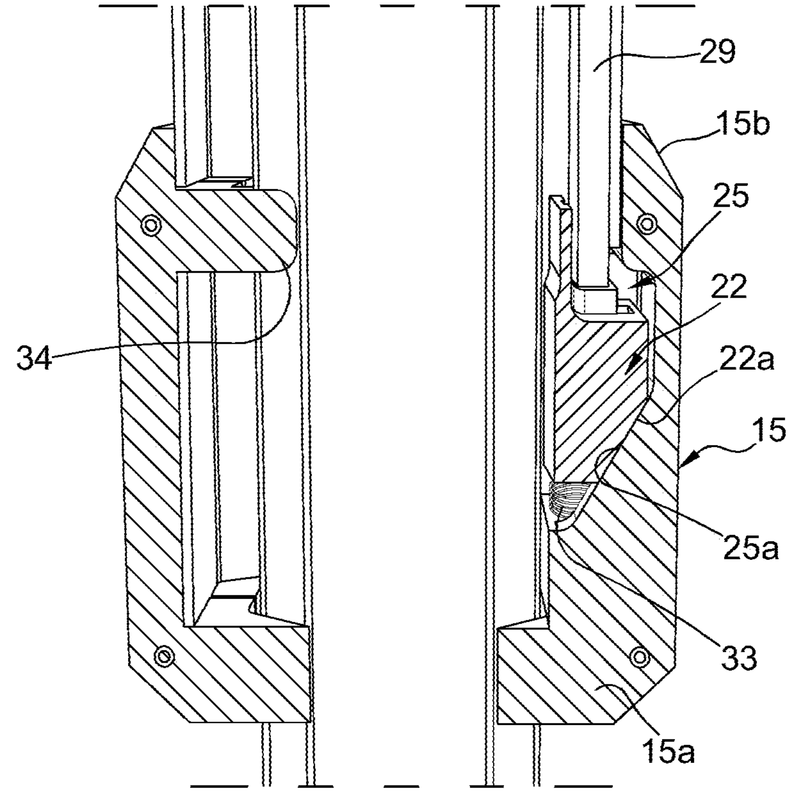
FIG. 11 is a schematic view in longitudinal section of a further detail of the telescopic leg of FIG. 9, at the second terminal.

FIGS. 9 to 11 illustrate a second embodiment of the telescopic leg obtained according to the present solution, overall indicated with 100.

Components of the telescopic leg 100 equal or similar to those of the telescopic leg 2 of the previous example are identified with the same numerical references.

The telescopic leg 100 differs from the telescopic leg 2 of the previous example substantially in a different configuration of the eccentric system connecting the lever 26 with the first and second brake 21, 22.

In this case, in fact, the pivoting movement of the lever 26 from the opening position to the closing position causes the two brakes 21, 22 to be pushed away from the pin 27 along the axis X.

Of course, in this case, the surfaces in mutual contact 21*a* and 24*a* of the first brake 21 and of the first terminal 14, as well as the surfaces 22*a* and 25*a* of the second brake and of the second terminal 15 are inclined in a manner opposite to the corresponding surfaces of the telescopic leg 2, so that the first and second brake 21, 22 are pushed against the respective first and third tubular sections 10, 12 when axially moved away from the operating member 23.

Furthermore, in this case, the eccentric system is formed by the same surface of the pin 27 which has a cam profile 30, better visible in FIG. 10, which abuts, on one side, directly the first brake 21 and, on the opposite side, the second transmission element 29, formed by a sheet that crosses the second tubular section 11, which, in this case, acts as a strut to displace the second brake 22 towards the locking position.

A further difference is given by the different conformation of the first terminal 14, which comprises, in the second portion **14*b* thereof, a projection 31 extended towards the inside of the second tubular section 11 and housed in a through slot 32 formed on the second tubular section 11**.

In this way, the first terminal 14 engages the first tubular section 10 in two distinct and axially spaced regions and, in addition, it allows to better abut the thrust action exerted on the first terminal 14 by the first brake 21.

The same solution is similarly provided in the coupling of the second terminal 15 on the second end **11*b* of the second tubular section 11, with a projection 34 extending radially from the second portion 15*a* towards the inside of the second tubular section 11**.

The operating mode of actuation of the telescopic leg 100 is completely similar to that of the telescopic leg 2 described above with reference to the previous example.

In a further embodiment variant, which applies to both the telescopic leg 2 and the telescopic leg 100, it is provided that the telescopic leg comprises a fourth tubular section 40 partially housed inside the third tubular section 12 to slide axially from and towards the inside of the third tubular section 12 through the second end **12*b*, which in this case is without the foot 13**.

The relative sliding between the fourth tubular section and the third tubular section 12 may be locked selectively or allowed by a further locking mechanism 41, which may be of conventional type.

Figure 12:
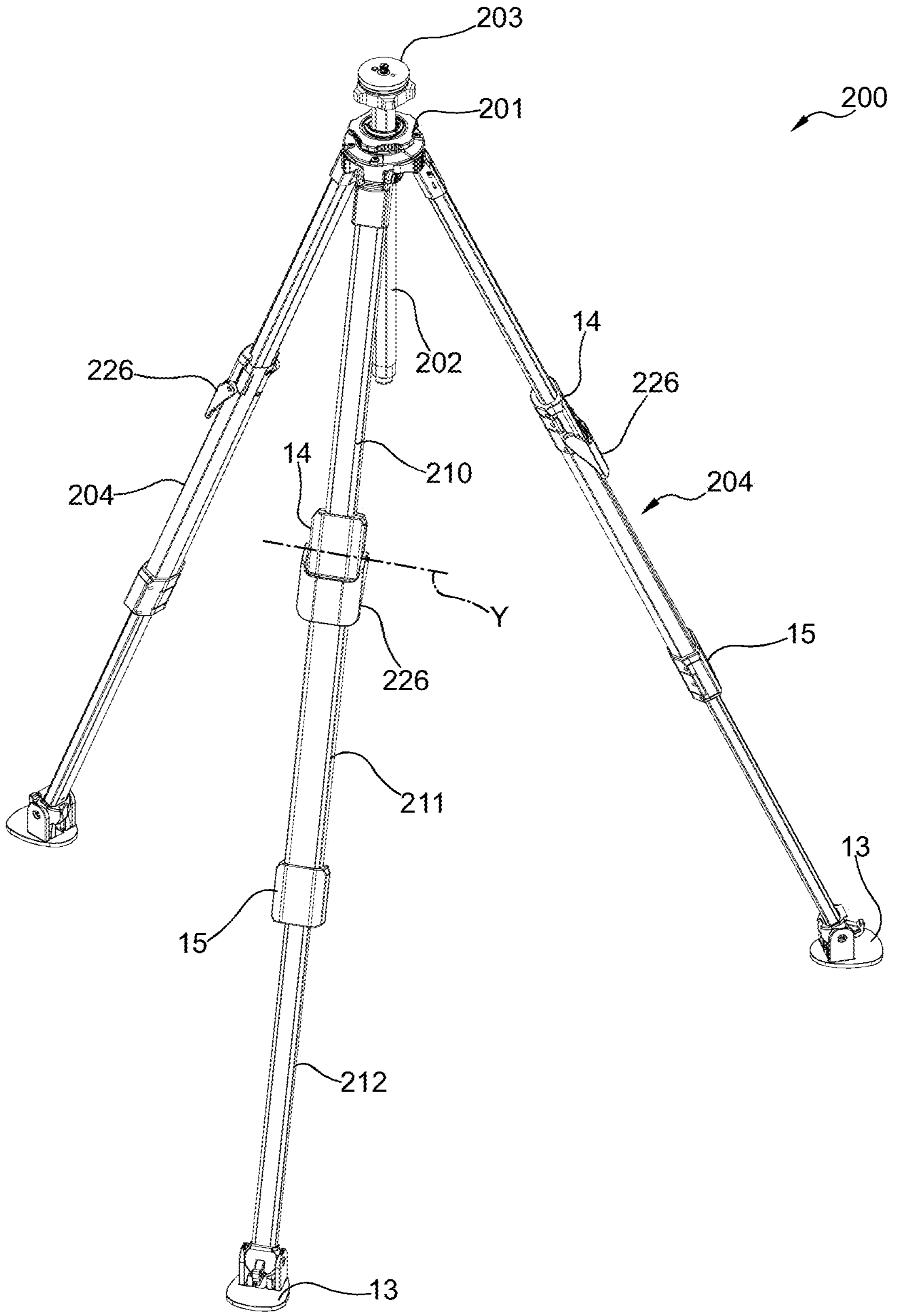
FIG. 12 is a schematic perspective view of a second example of support device for video-photographic apparatus realised according to the present invention, comprising a plurality of telescopic legs in extended configuration and with the locking mechanism in the locking position.

FIG. 12 depicts a tripod, indicated overall with 200, depicting a second embodiment of support device according to the present invention.

The tripod 200 comprises a crosspiece 201, in which a column 202 carrying at the top thereof an attachment plate 203 for a video-photographic apparatus is housed with the possibility of sliding.

In addition, three telescopic legs 204 are articulated to the crosspiece 201, each of which is substantially identical to the telescopic leg 2 or to the telescopic leg 100 described above, unless the plate 3 and the attachment element 4 are provided and the foot 13 is shaped differently.

Therefore, each telescopic leg 204 comprises three tubular sections 210, 211 and 212 and a unique, self-adjusting locking mechanism that can be actuated in locking and in release by means of a lever 226.

Thanks to the ergonomics and simplicity of the locking and release operations of the telescopic legs 204, the lever 226 is mounted so as to pivot outside the tripod 200, about an axis of rotation substantially parallel to the axis of articulation of the respective telescopic leg 204 with respect to the crosspiece 201.

The present invention thus solves the problem complained of above with reference to the cited prior art, while offering numerous other advantages.

Naturally, in order to satisfy specific and contingent application needs, a person skilled in the art will be able to make further modifications and variants to the invention described above, in any case falling within the scope of protection as defined by the claims that follow.

The invention claimed is:

1. A support device for video-photographic apparatus, comprising at least one telescopic leg displaceable between an extended configuration and a retracted configuration, said telescopic leg comprising:

a first tubular section, a second tubular section and a third tubular section which are connected in telescopic engagement one after another, a locking mechanism, configured to lock and to allow the relative sliding between said first tubular section, said second tubular section and said third tubular section, wherein:

said first tubular section is partially housed inside said second tubular section and is engaged with said second tubular section so as to slide axially away from and towards an inside of said second tubular section through a first end of said second tubular section; and said third tubular section is partially housed inside said second tubular section and is engaged with said second tubular section so as to slide axially away from and towards the inside of said second tubular section through a second end of said second tubular section, said second end being located longitudinally opposite to said first end, wherein said locking mechanism comprises:

a first brake, displaceable between a locking position in which the first brake locks the axial sliding of said first tubular section with respect to said second tubular section and a release position in which the first brake does not prevent the axial sliding of said first tubular section with respect to said second tubular section, a second brake, displaceable between a locking position in which the second brake locks the axial sliding of said third tubular section with respect to said second tubular section and a release position in which the second brake does not prevent the axial sliding of said third tubular section with respect to said second tubular section; and an operating member connected to said first brake and to said second brake so as to displace simultaneously said first brake and said second brake into the respective locking positions or into the respective release positions.

2. The device according to claim 1, wherein, when said telescopic leg is in the retracted configuration, said third tubular section is housed inside the first tubular section.

3. The device according to claim 1, wherein said first tubular section, said second tubular section and said third tubular section have a non-circular cross-section.

4. The device according to claim 1, wherein said operating member is pivotable about an axis of rotation (Y) between an opening position and a closing position and is connected to said first brake and to said second brake by an eccentric system such that a pivoting movement of said operating member between said opening position and said closing position corresponds to a displacement of said first brake and said second brake between said respective release positions and said respective locking positions.

5. The device according to claim 4, wherein said operating member is connected to said first brake and said second brake such that, when said operating member is pivoted from said opening position toward said closing position:

said first brake transmits to said operating member a first reaction force, said second brake transmits to said operating member a second reaction force, at least one component of said second reaction force has a direction parallel to and opposite to that of a component of said first reaction force, and wherein said operating member is mounted on said telescopic leg so that said axis of rotation (Y) is displaceable along said direction parallel to said components of said first reaction force and said second reaction force.

6. The device according to claim 5, wherein said first reaction force and said second reaction force are substantially parallel to a longitudinal axis (X) of said telescopic leg.

7. The device according to claim 4, wherein said operating member is mounted on said telescopic leg so that said axis of rotation (Y) is displaceable along a direction substantially parallel to a longitudinal axis (X) of said telescopic leg.

8. The device according to claim 4, wherein said first brake or said second brake are connected to said eccentric system by a first transmission element or, respectively, a second transmission element.

9. The device according to claim 4, wherein said first brake and said second brake are connected to said eccentric system by a first transmission element and, respectively, a second transmission element and wherein said first transmission element and said second transmission element are constrained to said eccentric system on opposite sides with respect to said axis of rotation (Y).

10. The device according to claim 4, wherein said operating member comprises a lever pivotable about a pin rotatable about said axis of rotation (Y) and housed for sliding in a seat formed in said second tubular section or in a component rigidly fixed to said second tubular section.

11. The device according to claim 10, wherein said eccentric system comprises a cam profile of said pin.

12. The device according to claim 1, wherein said operating member is mounted on said second tubular section.

13. The device according to claim 1, wherein said telescopic leg comprises a fourth tubular section partially housed inside said third tubular section and engaged with said third tubular section so as to slide axially away from and towards an inside of said third tubular section on an opposite side to said second tubular section.

* * * * *